Sept. 21, 1948.   L. HAMMON   2,449,603
CORNSTALK LIFTING DEVICE
Filed Aug. 30, 1944   2 Sheets-Sheet 1
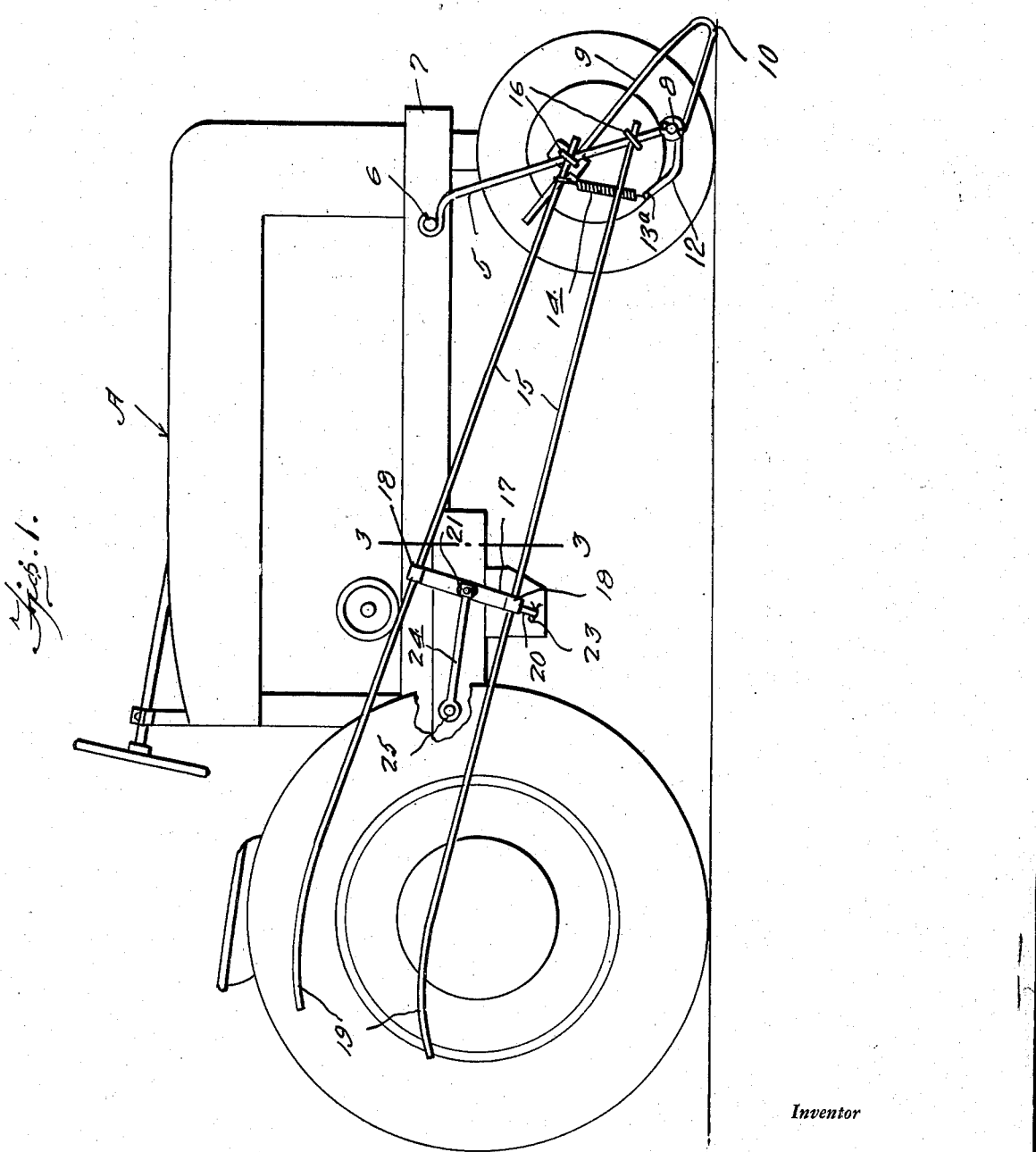
Inventor
Lester Hammon Sept. 21, 1948.  L. HAMMON  2,449,603
CORNSTALK LIFTING DEVICE
Filed Aug. 30, 1944  2 Sheets-Sheet 2
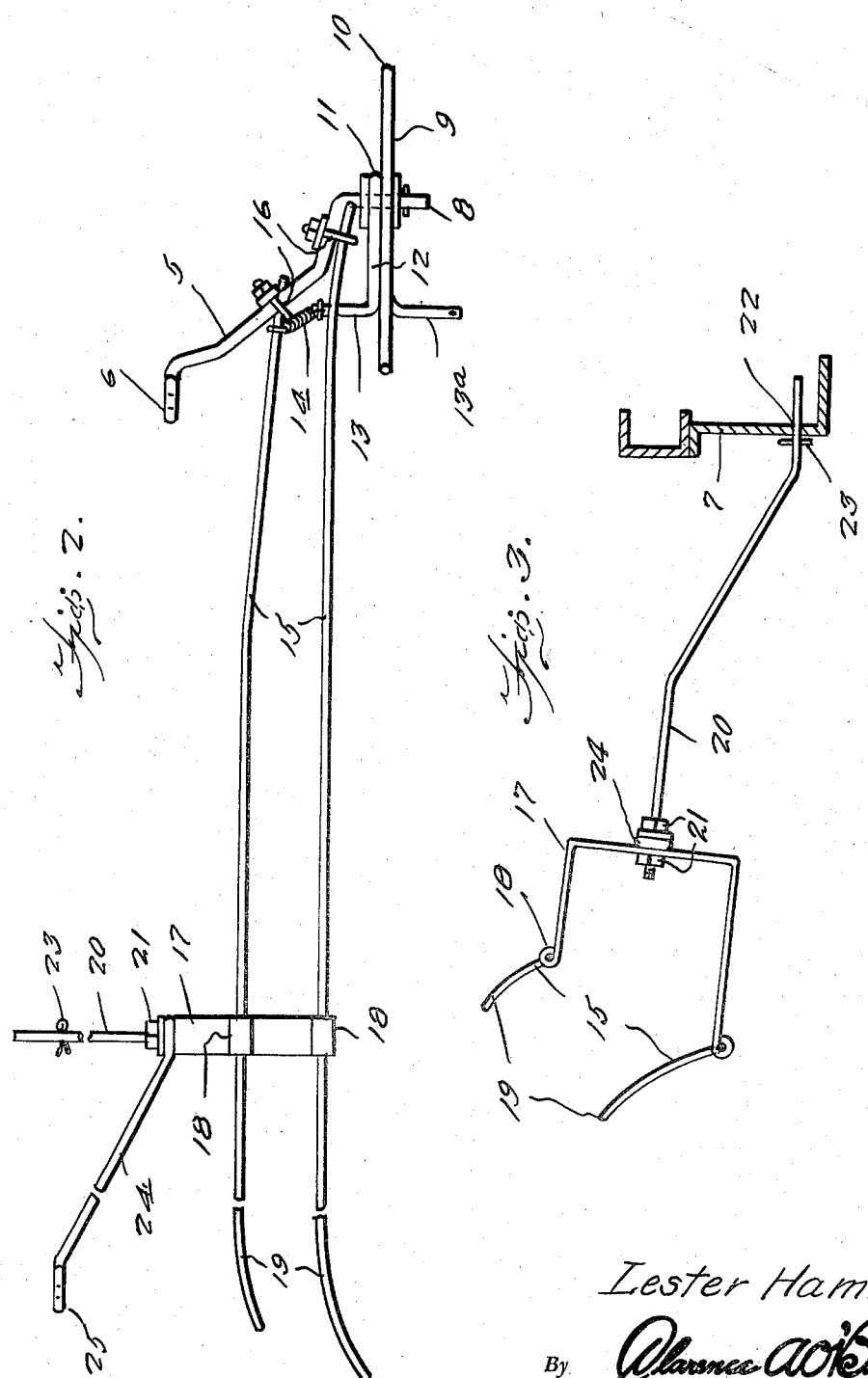
Inventor
Lester Hammon
By Clarence A. O'Brien
and Harvey B. Jacobson
Attorneys Patented Sept. 21, 1948

2,449,603

UNITED STATES PATENT OFFICE 2,449,603

CORNSTALK LIFTING DEVICE

Lester Hammon, Poplar Bluff, Mo.

Application August 30, 1944, Serial No. 551,885

2 Claims. (Cl. 56—119)

This invention relates to a device for lifting fallen or leaning stalks of corn in the field so as to position the same in a substantially upright position for proper passage to a corn husker.

More particularly, the present invention relates to a device of the above kind that may be readily attached to a tractor and that is simple in construction, efficient in operation, and otherwise adapted to meet with the requirements for a successful commercial use.

The exact nature of the present invention, as well as other objects and features thereof, will become apparent from the following description when considered in connection with the accompanying drawings. The invention consists in the novel form, combination and arrangement of parts hereinafter more fully described, shown in the drawings and claimed.

In the drawings, wherein like reference characters indicate similar parts throughout the views:

Figure 1 is a side elevational view, partly broken away, of a tractor equipped with a corn stalk lifting device constructed in accordance with the present invention.

Figure 2 is a top plan view of the attachment per se, partly broken away.

Figure 3 is a fragmentary transverse section taken substantially on line 3—3 of Figure 1.

Referring in detail to the drawings, 5 indicates an elongated bracket preferably formed of wire and provided at one end with an eye 6 for reception of a stud bolt by means of which the bracket may be rigidly fastened to the frame 7 of a tractor A at one side of and near the forward end of the latter. The bracket 5 is of a form to extend forwardly and downwardly from the point of attachment to the frame 7, and it termintes in its forward lower end with a lateral horizontal spindle 8 upon which is journaled for vertical rocking movement a nose member 9. This nose member preferably consists of a single length of wire return bent intermediate its ends to provide a forward nose portion 10 adapted to ride over inequalities of the ground, one leg of the return bent wire member being coiled to pivotally receive the spindle 8, as at 11, and then terminating in a rearwardly extending arm of angular form, as at 12, whose free end portion is directed laterally, as at 13, toward the bracket 5. The terminal portion 13 of arm 12 is connected with another part of the device by a helical tension spring 14 so that the nose member 9 is yieldingly rocked in a direction to engage its nose portion 10 with the ground in front of the spindle 8.

The attachment further includes a pair of elongated rods 15 whose forward ends are secured by clamps 16 in spaced relation and to the bracket 5 inwardly of the nose member 9. Intermediate their ends, the rods 15 are connected and maintained in spaced relation by a U-shaped bracket 17, and it will be noted that the ends of this bracket are formed with eyes 18 through which the rods 15 extend. Also, the rods 15 extend rearwardly from the bracket 5 in slightly rearwardly diverging relation, and the upper arm of bracket 17 is shorter than the lower arm so as to position the upper one of the rods 15 slightly inwardly of the lower one of said rods 15, as shown in Figure 3. The free rear ends of rods 15 preferably are curved in an outward direction to a slight extent, as indicated at 19. In order to maintain the rods in a rearwardly and upwardly inclined position, the bracket 17 is also connected to the adjacent side member of the tractor frame 7. For this purpose, a rod 20 is rigidly secured, as at 21, to the intermediate portion of bracket 17 at one end and is adapted to have its other end inserted in an opening provided at 22 in the tractor frame 7. A cotter pin 23, or the like, is passed through the rod 20 to limit the distance that the adjacent end of rod 20 may pass inwardly through the opening at 22, thereby holding the bracket 17 a proper distance from the side of the tractor, so that the rear portions of the rods 15 are disposed adjacent but outwardly of the adjacent rear wheel of the tractor. Another bracket 24 is fastened at one end to the bracket 17 and has an eye 25 at its other end to facilitate bolting of the latter end to the tractor frame 7 at a point rearwardly of bracket 17, as indicated in Figure 1. It will be evident that the attachment may be readily applied to a tractor by simply drilling three small holes in the tractor frame 7 at one side of the tractor to receive the bolts for brackets 5 and 24 and an end of the rod 20.

In use, a corn husker usually travels along directly behind the tractor and is drawn by the latter. The nose member 9 engages under fallen or leaning stalks of corn, transversely of and at a considerable distance from the point where the stalks enter the ground, so as to raise the latter and as the tractor moves ahead, these lifted stalks of corn are maintained in a substantially upright position by the rods 15. Continued forward travel of the tractor results in the stalks of corn finally passing to the outwardly curved rear ends 19 of rods 15 so as to cause the stalks of corn to be directed laterally and further lifted in proper position to be received by the corn husker.

It will be evident from the above that I have provided a very simple and efficient attachment for tractors for the intended purpose. It will be further evident that the attachment may be economically manufactured and readily installed. Minor changes in details of construction are contemplated, such as fall within the scope of the invention as claimed. A second lateral end portion 13a similar to the end portion 13 is attached to the arm 12 of nose member 9, and it extends in a direction opposite that in which the end portion 13 extends. By reversing the brackets, and attaching spring 14 to end portion 13a instead of to end portion 13, the device may be mounted at the other side of the tractor.

What I claim is:

1. In combination with a tractor, a device for lifting fallen or leaning stalks of corn in the field and delivering the same to a corn husker in a substantially upright position, said device comprising a substantially upright elongated bracket, means attaching the upper end of said bracket to one side of the tractor frame near the front of the latter, said bracket being provided at its lower end with a transverse horizontal spindle, a nose member pivoted for rocking movement on said spindle, said nose member being normally yieldingly tilted in a direction to engage its forward end portion with the ground, a pair of spaced elongated rods, means securing the forward ends of the rods to said bracket above said spindle, means connecting the rods intermediate their ends to maintain them in spaced relation, and means attached to said connecting means and secured to said side of the tractor frame rearwardly of the bracket to support the rods in rearwardly and upwardly inclined position, said rods extending to a point adjacent the rear end of the tractor.

2. As a tractor attachment, a device for lifting fallen or leaning stalks of corn in the field and delivering the same to a corn husker in a substantially upright position, comprising a substantially upright elongated bracket having means to facilitate attachment of the same at its upper end to one side of a tractor frame near the front of the latter, said bracket being provided at the lower end with a transverse horizontal spindle, a nose member pivoted for rocking movement on said spindle, said nose member being normally yieldingly tilted in a direction to engage its forward end portion with the ground, a pair of spaced elongated rods, means securing the forward ends of the rods to said bracket above said spindle, means connecting the rods intermediate their ends to maintain them in spaced relation, means attached to said connecting means and adapted for attachment to said side of the tractor frame rearwardly of the bracket to support the rods in rearwardly and upwardly inclined position, said rods being of a length to extend to a point adjacent the rear end of the tractor, said nose member comprising a single return-bent length of wire having one leg formed with a coil rotatably secured on the spindle and shaped at its rear end to provide an angular arm, and a tension spring connecting said arm to the bracket for normally yieldingly tilting the nose member in the direction to engage its forward end portion with the ground.

LESTER HAMMON.

REFERENCES CITED

The following references are of record in the file of this patent:

UNITED STATES PATENTS

| Number | Name | Date |
|---|---|---|
| 446,894 | Schuett | Feb. 24, 1891 |
| 1,344,761 | Hahn | June 29, 1920 |
| 1,706,641 | Warren | Mar. 26, 1929 |
| 1,707,992 | Pavlicek | Apr. 9, 1929 |
| 2,203,418 | Mills | June 4, 1940 |
| 2,261,118 | Kanehl | Nov. 4, 1941 |